May 29, 1962  R. J. BYRNES  3,036,691
ARTICLE CONVEYOR
Filed Dec. 21, 1959
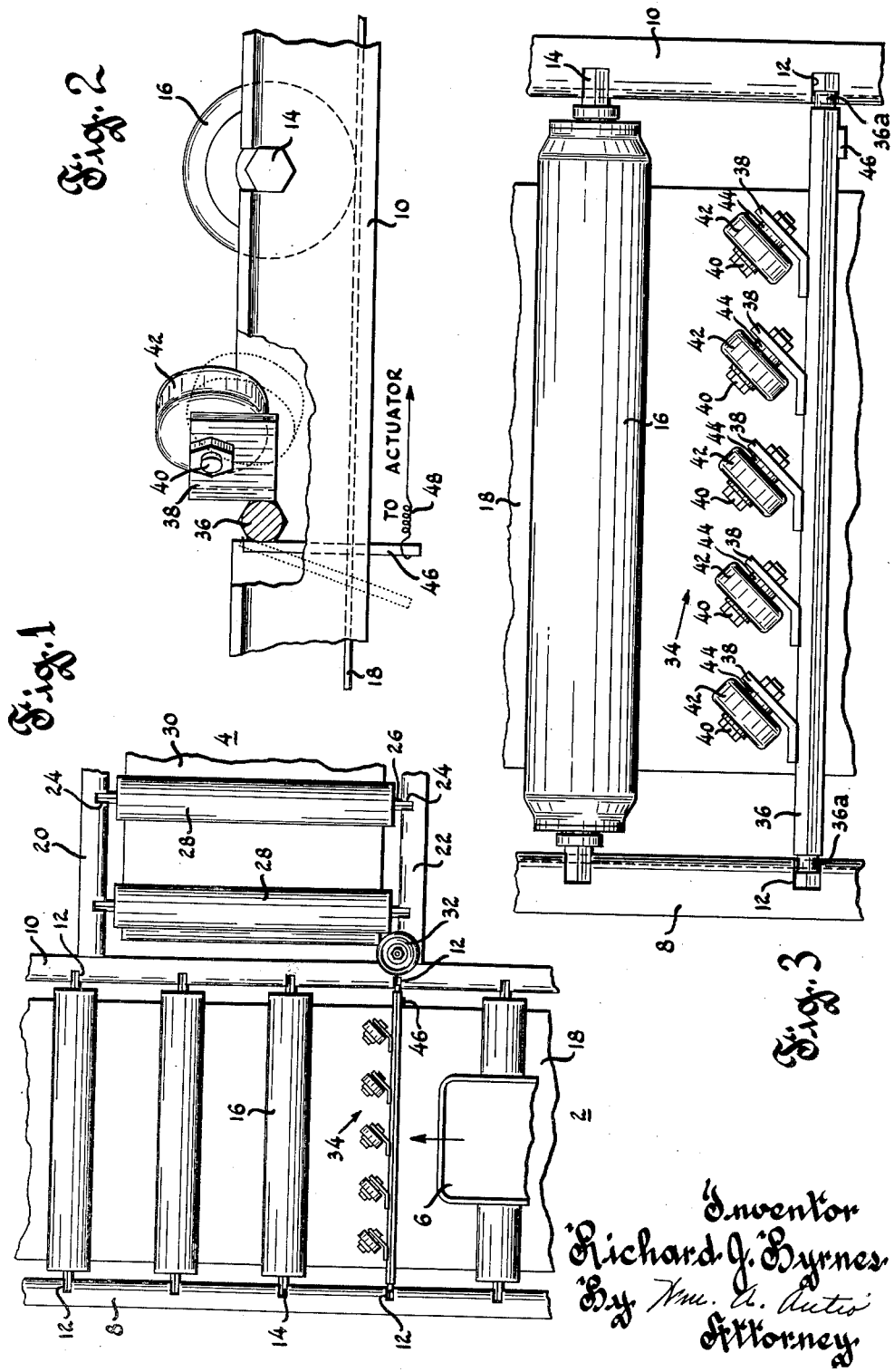
Inventor
Richard J. Byrnes
By Wm. A. Autio
Attorney

United States Patent Office 3,036,691
Patented May 29, 1962

3,036,691
ARTICLE CONVEYOR
Richard J. Byrnes, West Allis, Wis., assignor to Cutler-Hammer, Inc., Milwaukee, Wis., a corporation of Delaware
Filed Dec. 21, 1959, Ser. No. 861,039
10 Claims. (Cl. 198—20)

This invention relates to article conveyors and more particularly to a diverter mechanism therefor.

While not limited thereto, the invention is especially applicable to roller conveyors of the belt driven type or the like for diverting the thing being conveyed such as an article or article carrier from a main conveyor to a branch conveyor which is at a substantially right angle to or parallel with the main conveyor.

An object of the invention is to provide an improved diverter mechanism for a conveyor.

A more specific object of the invention is to provide an improved diverter mechanism which is simple and economical in construction and efficient and reliable in operation.

Another specific object of the invention is to provide an improved diverter device which can be mounted in place of a roller at any desired point along the conveyor or between rollers without significant modification of the conveyor.

A further specific object of the invention is to provide such diverter device which is capable of selectively turning and diverting an article or article carrier or one or more articles of a series thereof from a main conveyor to a branch conveyor which is at a right angle with or parallel to the main conveyor.

Another object of the invention is to provide an improved diverter device which is selectively and electrically operable between non-diverting and diverting positions and which is operable in its diverting position to steer an article substantially frictionlessly from one conveyor to another.

A further object of the invention is to provide such diverter device which is capable of selectively turning and diverting one or more articles of a series thereof which may be spaced relatively close to one another.

Another object of the invention is to provide a selectively operable diverter device which significantly increases the rate at which articles are diverted from one conveyor to another.

Other objects and advantages of the invention will hereinafter appear.

While the apparatus hereinafter described is effectively adapted to fulfill the objects stated, I do not intend to confine my invention to the particular preferred embodiment of diverter mechanism disclosed inasmuch as it is susceptible of various modifications without departing from the scope of the appended claims.

The invention will now be described in detail with reference to the accompanying drawings wherein:

FIGURE 1 is a top view of an article conveyor and diverter mechanism constructed in accordance with the invention;

FIG. 2 is an enlarged side elevation view of a portion of the conveyor of FIG. 1 with a part broken away to show the diverter mechanism; and FIG. 3 is an enlarged fragmentary top view of the conveyor of FIG. 1 showing the diverter mechanism.

Referring to FIG. 1, there is shown an article conveyor consisting of a main conveyor 2 and a branch conveyor 4, the latter extending from the right-hand side of the main conveyor at a right angle. The conveyors are of the well known belt-driven roller type and are adapted for conveying an article or article carrier such as, for example, a tray 6 or the like. Main conveyor 2 is provided with a pair of generally shallow U-shaped support or frame members 8 and 10 arranged on edge with the bottoms of the U-shaped members arranged in opposed relation to form side rails for the conveyor. The upper, inner corners of frame members 8 and 10 are provided with equally spaced notches 12, each notch on member 8 being in lateral alinement with a corresponding notch on member 10 and each such pair of alined notches being adapted to accommodate and securely support the ends of an axle 14 of a conveyor roller 16. The ends of axle 14 are of hexagonal cross section or may be provided with suitable flat or partially flat sides to be held against rotation in their associated notches 12, whereas roller 16 is mounted for free rotation on the axle. It will be apparent that rollers 16 are held in their respective positions by gravity and that each such roller may be freely lifted from its notches if it is desired to remove the same. Rollers 16 are frictionally driven by an endless motor-driven belt 18. In conveyors of this type, a plurality of idler rollers, not shown, are mounted below belt 18 and these idler rollers are staggered relative to rollers 16 to bias belt 18 into frictional engagement with rollers 16.

Similarly branch conveyor 4 is provided with a pair of like spaced frame members 20 and 22, each having notches 24 for receiving the ends of axles 26 of a plurality of spaced rollers 28. These rollers are frictionally driven by an endless motor-driven belt 30 and a plurality of freely rotatable idler rollers, not shown, are mounted in a suitable manner below belt 30 for biasing the belt into frictional engagement with rollers 28. A freely rotatable guide wheel 32 is journaled on the end of frame member 22 at the entry side of branch conveyor 4 for guiding tray 6 as it turns from the main conveyor to the branch conveyor.

While branch conveyor 4 has been illustrated as being at a right angle to main conveyor 2, it will be apparent that it could as well be in adjacent parallel arrangement with the main conveyor.

Main conveyor 2 is provided with a diverter mechanism 34 immediately adjacent the entry side of the branch conveyor as shown in FIG. 1 and as shown on an enlarged scale in FIG. 3. This diverter mechanism is mounted in place of one conveyor roller. As shown in FIGS. 2 and 3, diverter mechanism 34 is provided with an elongated supporting rod 36 of hexagonal cross-section along its length and having rounded end portions 36a to afford free rotation of such rod in slots 12 of frame members 8 and 10. A plurality of diverting wheel supporting brackets 38 are rigidly secured as by welding at one end thereof in spaced apart relation, preferably equally spaced apart relation, along a vertical side of rod 36. The other end of each such bracket 38 is bent away from rod 36 so that it diverges therefrom at an acute angle of substantially 45 degrees to the axis of rod 36. The diverging portion of each bracket 38 is provided adjacent the upper edge thereof, as more clearly seen in FIG. 2, with a hole accommodating a diverting wheel axle 40. Axle 40 extends through wheel 42 centrally thereof and through the hole in bracket 38 and is secured to the latter and spaced therefrom by a washer 44 to afford free rotation of the wheel on its axle. A downwardly depending arm 46 is rigidly secured as by welding at its upper end to the other vertical side of rod 36 adjacent the right-hand end of the latter. The lower end of arm 46 is connected through a tension spring 48 or the like to an actuator. The actuator may be an electroresponsive device, such as an electromagnetic solenoid or the like having resilient spring 48 connected to its plunger.

While diverter mechanism 34 is shown mounted in place of a conveyor roller, it will be apparent that it could also be mounted between a pair of conveyor rollers by providing suitable notches on frame members 8 and 10.

The operation of the diverter mechanism will now be described. Let it be assumed that tray 6 is being conveyed along main conveyor 2 in the direction shown by the arrow in FIG. 1. The weight of the diverter wheels normally causes the diverter mechanism to assume the position shown in dotted lines in FIG. 2 when the actuator is not energized wherein diverter wheels 42 are below the upper level of conveyor rollers 16 and do not engage tray 6. To divert an approaching tray from the main conveyor onto the branch conveyor, the actuator is energized to pull arm 46 in the direction shown by the arrow in FIG. 2. This causes supporting rod 36 to rotate in slots 12 in the frame members and to lift the diverting wheels 42 upwardly to the position shown in solid lines in FIG. 2. As a result, wheels 42 engage the bottom of tray 6 and turn and divert the latter onto branch conveyor 4. The function of resilient tension spring 48 in the actuator connection is to provide resiliency in the upward bias of the diverting wheels under the force of the actuator and to permit the tray to depress the diverting wheels downwardly so that the traveling tray also remains in engagement with the conveyor rollers. Also the resilient upward bias of the diverter wheels against the bottom of the tray maintains engagement therebetween if there is unevenness in the bottom of the tray, and the resiliency in spring 48 permits the actuator solenoid to seal, that is, the resiliency of spring 48 permits the magnetic force of the electroresponsive device to move its plunger to its completely attracted position, in the event there is a tray over the diverter when the actuator is energized.

I claim:

1. In a conveyor of the roller type for conveying articles therealong and having a plurality of article supporting and conveying rollers spaced longitudinally thereof, the improvement comprising a diverter mechanism mounted at a selected point along the conveyor in place of one of the rollers, said diverter mechanism comprising a supporting member rotatably mounted across the conveyor, at least one diverter wheel, bracket means supporting said wheel on one side of said member for rotation about a horizontal axis and the vertical plane of said wheel being at a predetermined angle from the normal line of travel of the articles along the conveyor toward one side of the latter, said wheel having a non-diverting position wherein it is below the upper level of the adjacent rollers and does not engage an article passing thereover along the conveyor, and actuator means for rotating said supporting member to raise said wheel a predetermined amount above the upper level of the adjacent rollers to engage an article and to turn and divert the same off the conveyor.

2. The invention defined in claim 1, wherein said actuator means comprises resilient means affording said wheel a resilient upward bias to engage the article, said wheel being depressible under the weight of the article against the force of said resilient means to maintain engagement between the article and an adjacent roller.

3. In a conveyor of the roller type for conveying articles therealong and having a plurality of article supporting and conveying rollers spaced longitudinally thereof, the improvement comprising a diverter mechanism mounted at a selected point along the conveyor between a pair of the rollers, said diverter mechanism comprising an elongated supporting member mounted transversely of the conveyor for rotation on its axis, a plurality of diverter wheels arranged in a row transversely of the conveyor between said supporting member and an adjacent roller, means supporting said wheels on said member for rotation on horizontal axes and the vertical plane of each wheel being at a predetermined angle toward a side of the conveyor from the normal line of travel of the articles along the conveyor, the weight of said wheels normally causing said elongated supporting member to assume a rotated position in one direction wherein said wheels are slightly below the upper level of the adjacent rollers and do not engage an article passing thereover along the conveyor, and actuator means selectively operable to rotate said elongated supporting member in the other direction to raise said wheels above the upper level of the adjacent rollers to engage an article and to divert the same off the conveyor.

4. The invention defined in claim 3, wherein said actuator means comprises an arm secured at one end to said elongated supporting member and extending radially therefrom, and means coupling the other end of said arm and an actuator whereby movement of said other end of said arm causes rotation of said elongated supporting member in said other direction to raise said wheels, and deactivation of said actuator causes said wheels to lower under gravity below the upper level of the adjacent rollers.

5. The invention defined in claim 3, wherein said predetermined angle is an angle of substantially forty-five degrees toward one side of the conveyor from the principal axis thereof.

6. The invention defined in claim 3, wherein said conveyor is provided with a pair of supporting side members one on each side thereof, pairs of notches in said side members, the notches of each pair thereof being laterally aligned to accommodate the opposite end portions of a roller axle, and said elongated supporting member being mounted in one pair of said notches in place of a conveyor roller.

7. The invention defined in claim 6, wherein the end portions of said elongated supporting member are rounded to afford rotation thereof in said notches.

8. The invention defined in claim 3, wherein said elongated supporting member is provided with a vertical flat side extending therealong, and said means supporting said wheels on said member comprises a plurality of brackets one for each wheel, said brackets being spaced along said member, one end of each said bracket being rigidly secured to said flat side of said member and the other end thereof diverging from the axis of said member at an angle of substantially forty-five degrees, each wheel being mounted on such other end of its associated bracket.

9. In a roller conveyor having a main conveyor extending in a first direction for conveying article carriers therealong and a branch conveyor extending from and in a direction transverse to the main conveyor for receiving and conveying such article carriers which are diverted from the main conveyor, said main conveyor having a pair of spaced side members, notches spaced along said side members with the notches of each pair thereof being in alinement transversely of the main conveyor, a plurality of carrier supporting and conveying rollers spaced longitudinally of the main conveyor and each such roller having an axle the opposite ends of which are supported in the notches of a pair thereof, the improvement comprising a diverter mechanism mounted at a selected point along the main conveyor immediately adjacent the entry side of the branch conveyor and in a pair of said notches, said diverter mechanism comprising an elongated supporting bar arranged transversely of the main conveyor, the ends of said bar being journaled for rotation in said pair of notches, a plurality of brackets extending in parallel from one side of said bar and rigidly secured thereto at one end and spaced therealong, the other end of each said bracket diverging from said bar at an angle of substantially forty-five degrees toward the branch conveyor, a diverting wheel journaled on such other end of each said bracket for rotation on a horizontal axis, said wheels normally assuming a non-diverting position below the upper level of the adjacent rollers, and means for rotating said bar to raise said wheels slightly above the upper level of the adjacent rollers for engaging the bottom of an article carrier to turn and divert the same onto the branch conveyor.

10. In a conveyor system having a main conveyor for conveying articles therealong and a branch conveyor for receiving and conveying articles diverted from the main conveyor, said main conveyor having a plurality of article supporting and conveying rollers substantially equally spaced longitudinally thereof, the improvement comprising:

(a) a narrow elongated diverter mechanism,
(b) means mounting said diverter mechanism between first and third rollers at any point along the main conveyor in the space provided by removal of the second roller,
(c) said diverter mechanism comprising an elongated supporting device mounted transversely of the main conveyor,
(d) a plurality of diverter wheels mounted in a row on said supporting device and having a non-diverting position wherein said diverting wheels normally allow movement of the articles thereover along the main conveyor,
(e) and electroresponsive means for actuating said supporting device to move said diverting wheels to a diverting position, and in said diverting position the vertical planes of said wheels being parallel to one another and directed at substantially forty-five degrees from the forward direction of said main conveyor toward one side thereof whereby said wheels engage the bottom of the next article and turn and divert the same to the branch conveyor arranged transversely relative to the main conveyor.

References Cited in the file of this patent

UNITED STATES PATENTS

| | | |
|---|---|---|
| 2,136,267 | Taylor | Nov. 8, 1938 |
| 2,874,818 | Carter et al. | Feb. 24, 1959 |
| 3,018,873 | Burt | Jan. 30, 1962 |

FOREIGN PATENTS

| | | |
|---|---|---|
| 380,242 | France | Oct. 2, 1907 |